United States Patent
Kliewer

(10) Patent No.: US 10,766,331 B2
(45) Date of Patent: Sep. 8, 2020

(54) INDEPENDENT AIR SUSPENSION

(71) Applicant: Ronald Jeremy Kliewer, McMinnville, TN (US)

(72) Inventor: Ronald Jeremy Kliewer, McMinnville, TN (US)

( * ) Notice: Subject to any disclaimer, the term of this patent is extended or adjusted under 35 U.S.C. 154(b) by 85 days.

(21) Appl. No.: 16/263,832

(22) Filed: Jan. 31, 2019

(65) Prior Publication Data

US 2019/0283521 A1 Sep. 19, 2019

Related U.S. Application Data

(60) Provisional application No. 62/644,647, filed on Mar. 19, 2018.

(51) Int. Cl.
| | |
|---|---|
| *B60G 17/052* | (2006.01) |
| *B60G 17/015* | (2006.01) |
| *B60G 15/12* | (2006.01) |

(52) U.S. Cl.
CPC ..... *B60G 17/0523* (2013.01); *B60G 17/0155* (2013.01); *B60G 15/12* (2013.01); *B60G 2202/152* (2013.01); *B60G 2300/04* (2013.01)

(58) Field of Classification Search
CPC ............ B60G 17/0523; B60G 17/0155; B60G 2300/04; B60G 15/12; B60G 2202/152; B60G 2200/132; B60G 3/145; B60G 2206/011; B60G 2202/242
See application file for complete search history.

(56) References Cited

U.S. PATENT DOCUMENTS

| | | |
|---|---|---|
| 2,903,272 A | 9/1959 | Bordenkircher et al. |
| 3,078,104 A | 2/1963 | Chalmers et al. |
| 3,784,221 A | 1/1974 | Frasier, Sr. |
| 4,792,148 A | 12/1988 | Hintz |
| 5,951,032 A | 9/1999 | Overby et al. |
| 6,257,597 B1 | 7/2001 | Galazin |
| 6,340,165 B1 * | 1/2002 | Kelderman ............ B60G 7/001 280/124.153 |
| 6,349,952 B1 | 2/2002 | Kallstrom |
| 6,412,789 B1 | 7/2002 | Pierce et al. |
| 6,454,283 B1 | 9/2002 | Fenton |
| 6,752,406 B2 | 6/2004 | Pierce et al. |
| 6,834,874 B1 | 12/2004 | Overby |
| 7,938,411 B2 | 5/2011 | Stahl et al. |
| 7,946,603 B2 | 5/2011 | Hammond |
| 8,226,098 B2 | 7/2012 | VanDenberg et al. |
| 8,282,115 B2 | 10/2012 | Stephani |
| 8,720,938 B2 | 5/2014 | Ehrlich |

(Continued)

*Primary Examiner* — Drew J Brown

(74) *Attorney, Agent, or Firm* — Dunlap Bennett & Ludwig, PLLC

(57) ABSTRACT

An air suspension for a vehicle includes a mounting bracket configured to couple to the vehicle. A pivot bracket includes a top and a bottom. The top is pivotably coupled to a frontward portion of the mounting bracket. An air shock absorber includes a first end and a second end. The first end is pivotably coupled to the bottom of the pivot bracket and the second end is pivotably coupled to a rearward portion of the mounting bracket. An axle arm includes a first portion and a second portion. The first portion of the axle arm is fixedly coupled to the frontward portion of the mounting bracket. A spindle is fixedly coupled to the second portion of the axle arm and is configured to be coupled to a hub assembly of a wheel.

7 Claims, 3 Drawing Sheets

(56) References Cited

U.S. PATENT DOCUMENTS

| | | |
|---|---|---|
| 8,840,119 B2 | 9/2014 | Davis |
| 9,022,404 B2 | 5/2015 | Risse et al. |
| 2002/0079665 A1* | 6/2002 | VanDenberg ...... B60G 17/0277 280/124.106 |
| 2002/0130474 A1 | 9/2002 | Richardson |
| 2003/0067136 A1 | 4/2003 | Scott et al. |
| 2009/0273159 A1* | 11/2009 | Sutton .................. B60G 11/265 280/419 |
| 2010/0117320 A1 | 5/2010 | Grozev et al. |
| 2010/0230922 A1* | 9/2010 | Beno ...................... B60G 7/001 280/124.111 |
| 2014/0306425 A1* | 10/2014 | Atkinson ............. B60G 13/003 280/414.5 |
| 2017/0246926 A1 | 8/2017 | Macnamara |
| 2018/0272819 A1* | 9/2018 | Galla .................... B60G 7/001 |

* cited by examiner

INDEPENDENT AIR SUSPENSION

CROSS-REFERENCE TO RELATED APPLICATION

This application claims the benefit of priority of U.S. provisional application No. 62/644,647, filed Mar. 19, 2018, the contents of which are herein incorporated by reference.

BACKGROUND OF THE INVENTION

The present invention relates to a trailer suspension and, more particularly, to an independent air suspension trailer axle.

Currently there is not an independent trailer axle that will adjust for lighter loads. Current trailer suspensions are too stiff for light loads and results in little to no suspension. This causes for a very rough ride because the trailer wheels bounce and loses contact with the road.

As can be seen, there is a need for an independent air suspension trailer axle.

SUMMARY OF THE INVENTION

In one aspect of the present invention, an air suspension comprises: a mounting bracket configured to couple to a vehicle; a pivot bracket comprising a top and a bottom, wherein the top is pivotably coupled to a frontward portion of the mounting bracket; an air shock absorber comprising a first end and a second end, wherein the first end is pivotably coupled to the bottom of the pivot bracket and the second end is pivotably coupled to a rearward portion of the mounting bracket; an axle arm comprising a first portion and a second portion, wherein the first portion of the axle arm is fixedly coupled to the frontward portion of the mounting bracket; and a spindle comprising a first end and a second end, wherein the first end of the spindle is fixedly coupled to the second portion of the axle arm, and the second end is configured to be coupled to a hub assembly of a wheel.

These and other features, aspects and advantages of the present invention will become better understood with reference to the following drawings, description and claims.

DETAILED DESCRIPTION OF THE INVENTION

The following detailed description is of the best currently contemplated modes of carrying out exemplary embodiments of the invention. The description is not to be taken in a limiting sense, but is made merely for the purpose of illustrating the general principles of the invention, since the scope of the invention is best defined by the appended claims.

The present invention includes an independent air suspension trailer axle. By utilizing an air suspension coupled with the design of the axle, the suspension can be adjusted for light loads and help prevent axles from bouncing off of the contact surface, i.e. the road. The design is one that allows for light loads and includes infinite adjustability via air pressure to provide a wide range of suspension.

Figure 1:
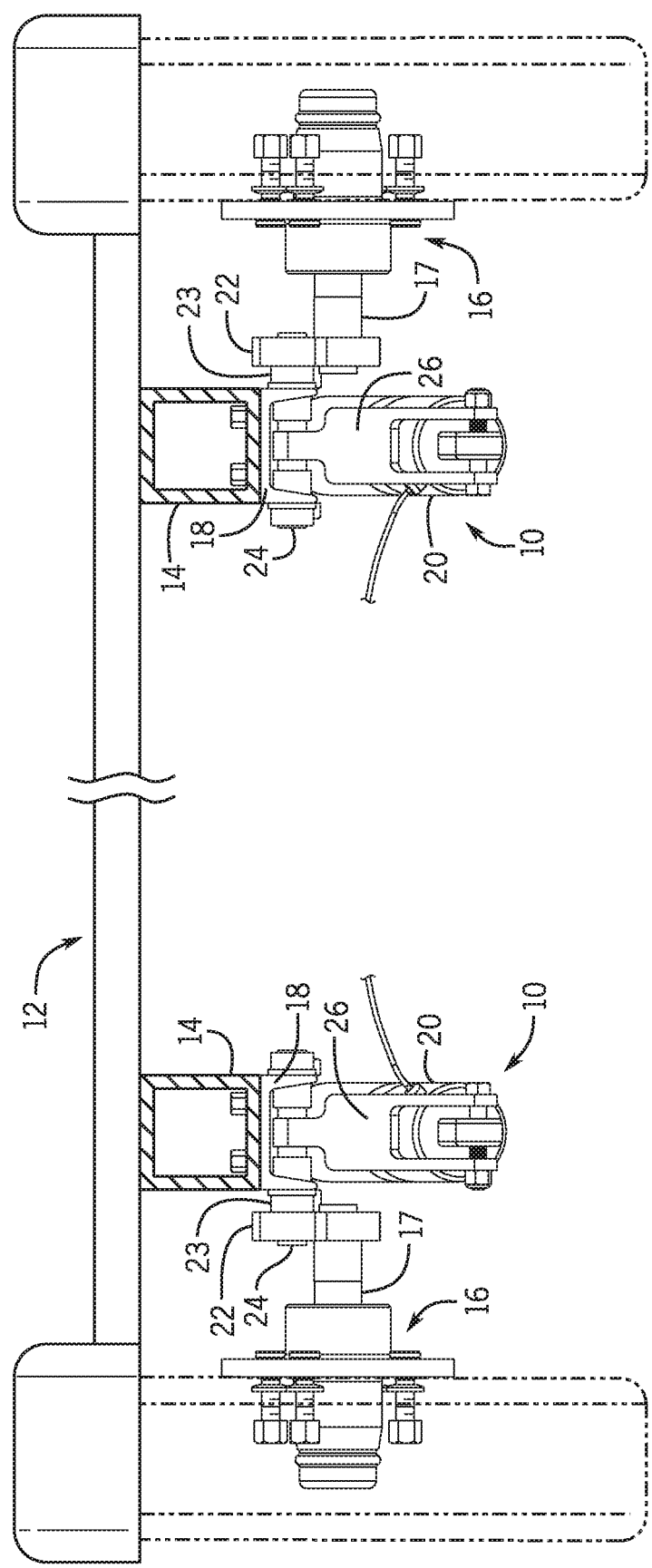
FIG. 1 is a front elevation view of an embodiment of the present invention in use.
Figure 2:
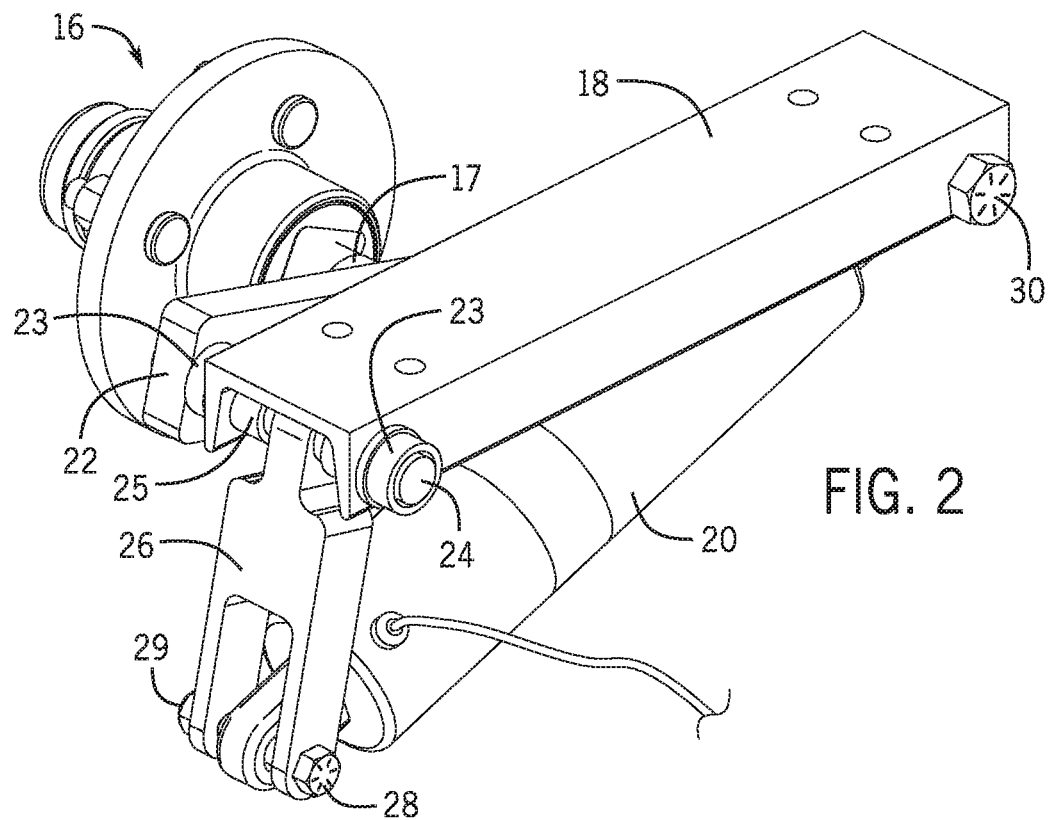
FIG. 2 is a front perspective view of an embodiment of the present invention.
Figure 3:
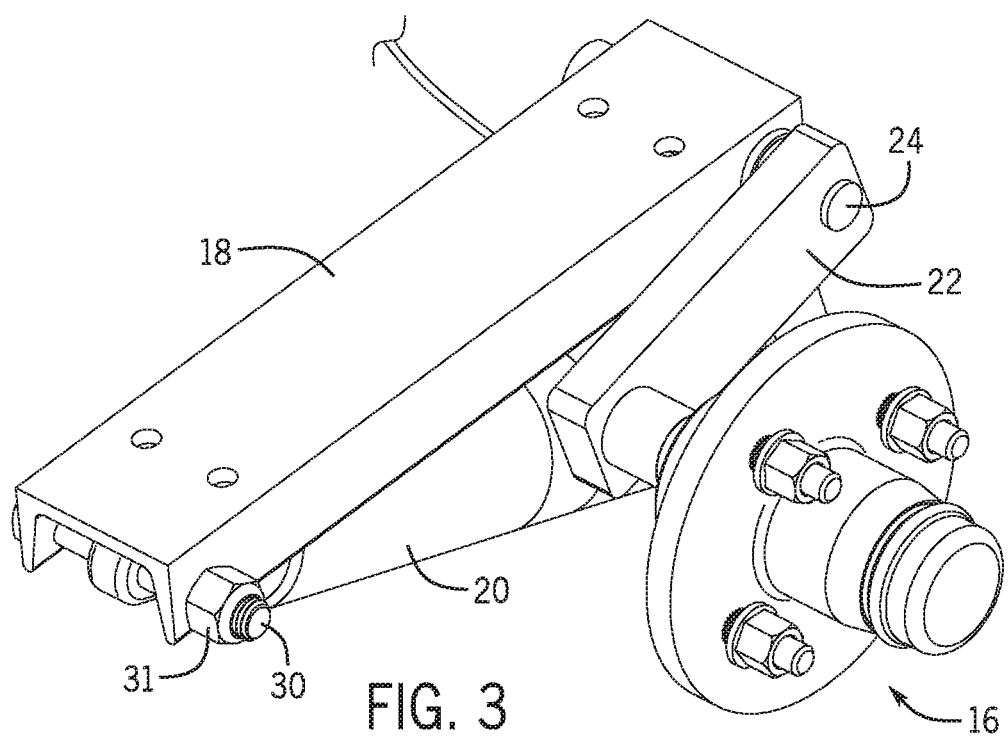
FIG. 3 is a rear perspective view of an embodiment of the present invention.
Figure 4:
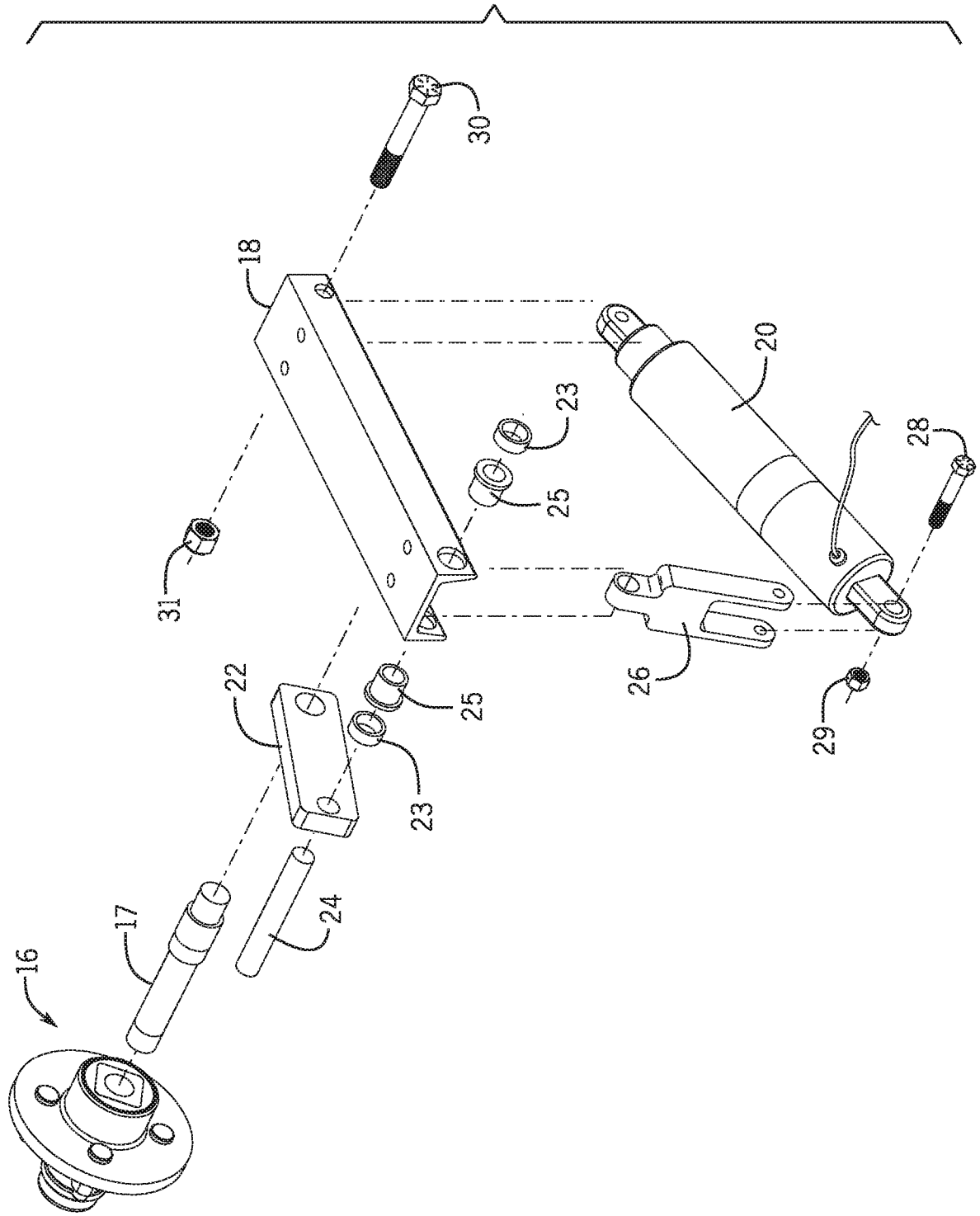
FIG. 4 is an exploded view of an embodiment of the present invention.

Referring to FIGS. 1 through 4, the present invention includes an air suspension 10 for a vehicle. The air suspension 10 includes a mounting bracket 18 configured to couple to the vehicle. A pivot bracket 26 includes a top and a bottom. The top is pivotably coupled to a frontward portion of the mounting bracket 18. An air shock absorber 20 includes a first end and a second end. The first end is pivotably coupled to the bottom of the pivot bracket 26 and the second end is pivotably coupled to a rearward portion of the mounting bracket 18. An axle arm 22 includes a first portion and a second portion. The first portion of the axle arm 22 is fixedly coupled to the frontward portion of the mounting bracket 18. A spindle 17 includes a first end and a second end. The first end of the spindle 17 is fixedly coupled to the second portion of the axle arm 22. The second end of the spindle 17 is configured to be coupled to a hub assembly 16 of a wheel.

The mounting bracket 18 may include a base having a plurality of openings. The plurality of openings of the base receive bolts to couple to the vehicle. The mounting bracket 18 may further include sidewalls extending from either side of a bottom surface of the base along a length of the mounting bracket 18. The sidewalls define a channel therebetween. A pair of aligning openings are formed through opposing sidewalls at the frontward portion and the rearward portion.

In certain embodiments, the present invention includes a pivot axle 24. The pivot axle 24 is rotatably coupled to the frontward portion of the mounting bracket 18 by bushings 25. In such embodiments, the bushings 25 are disposed within the pair of aligning openings formed through sidewall at the frontward portion. The pivot axle 24 runs through and is rotatably disposed within the bushings 25. Collars 23 may be coupled to the bushings 25 to secure the pivot axle 24 within the bushings 25. In such embodiments, the first end of the pivot axle 24 is fixedly coupled to the first portion of the axle arm 22, and the top of the pivot bracket 26 is fixedly coupled to the pivot axle 24.

The bottom of the pivot bracket 26 may include a fork having aligning openings. In such embodiments, the first end of the air shock absorber 20 includes an aligning opening disposed within the fork. A bolt 28 runs through the aligning openings of the fork and the first end of the air shock absorber 20 and a nut 29 mechanically fastens to the end of the bolt 28, pivotably coupling the pivot bracket 26 to the air shock absorber 20. Additionally, the second end of the air shock absorber 20 may include an opening that aligns with the pair of aligning openings of the sidewalls at the rearward portion of the mounting bracket 18. A bolt 30 runs through the aligning openings of the second end of the air shock absorber 20 the pair of aligning openings of the sidewalls, and a nut 31 mechanically fastens to the end of the bolt 30, pivotably coupling the air shock absorber 20 to the mounting bracket 18.

The air shock absorber 20 includes telescoping tubing, an inlet valve to receive air pressure, and a release valve to release pressure. The present invention may be used with vehicles, such as trailers 12. While in use, two air suspensions 10 may be coupled to cross beams 14 of the trailer 12. A user may adjust the psi of each of the air shock absorbers 20, depending on the weight of the load. For example, for lighter loads, the air shock absorbers 20 may be adjusted to have less psi and for larger loads, the air shock absorbers 20 may be adjusted to have increased psi. While in use, the wheels may bump upwards or downwards. When the wheel bumps upwards or downwards, the axle arm 22 moves up and down with the wheel. The movement of the axle arm 22 causes the pivot bracket 26 to pivot and cause linear movement between the telescoping tubing of the air shock absorbers 20. Due to the pressurizes air shock absorbers 20, the movement of the wheels caused from the bumps are reduced, producing a smoother ride for the trailer 12.

It should be understood, of course, that the foregoing relates to exemplary embodiments of the invention and that modifications may be made without departing from the spirit and scope of the invention as set forth in the following claims.

What is claimed is:

1. An air suspension comprising:
    a mounting bracket configured to couple to a vehicle;
    a pivot bracket comprising a top and a bottom, wherein the top is pivotably coupled to a frontward portion of the mounting bracket;
    an air shock absorber comprising a first end and a second end, wherein the first end is pivotably coupled to the bottom of the pivot bracket and the second end is pivotably coupled to a rearward portion of the mounting bracket;
    an axle arm comprising a first portion and a second portion, wherein the first portion of the axle arm is fixedly coupled to the frontward portion of the mounting bracket; and
    a spindle comprising a first end and a second end, wherein the first end of the spindle is fixedly coupled to the second portion of the axle arm, and the second end is configured to be coupled to a hub assembly of a wheel.

2. The air suspension of claim 1, further comprising:
    a pivot axle rotatably coupled to the frontward portion of the mounting bracket by bushings, wherein a first end of the pivot axle is fixedly coupled to the first portion of the axle arm, and the top of the pivot bracket is fixedly coupled to the pivot axle.

3. The air suspension of claim 1, wherein the bottom of the pivot bracket comprises a fork comprising aligning openings, wherein the first end of the air shock absorber comprises an aligning opening disposed within the fork, wherein a bolt is disposed within the aligning openings, pivotably coupling the pivot bracket to the air shock absorber.

4. The air suspension of claim 1, wherein the rearward portion of the mounting bracket comprises aligning openings and the second end of the air shock absorber comprises an aligning opening, wherein a bolt is disposed within the aligning openings, pivotably coupling the second end of the air shock absorber to the mounting bracket.

5. The air suspension of claim 1, wherein the air shock absorber comprises telescoping tubing and an inlet to receive air pressure.

6. The air suspension of claim 5, wherein psi within the air shock absorber is adjustable via the inlet.

7. The air suspension of claim 1, wherein the mounting bracket is coupled to a cross beam of a trailer.

* * * * *